(12) United States Patent
Goseling (10) Patent No.: US 10,288,358 B2
(45) Date of Patent: May 14, 2019

(54) COLD RESERVOIR DEVICE AND COOLING SYSTEM ARRANGEMENT

(71) Applicant: GOSELING UG, Assamstadt (DE)

(72) Inventor: Hubert Goseling, Assamstadt (DE)

(73) Assignee: GÜDEL GROUP AG, Langenthal (CH)

( * ) Notice: Subject to any disclaimer, the term of this patent is extended or adjusted under 35 U.S.C. 154(b) by 15 days.

(21) Appl. No.: 14/417,375

(22) PCT Filed: Jul. 31, 2013

(86) PCT No.: PCT/DE2013/000418
§ 371 (c)(1),
(2) Date: May 5, 2015

(87) PCT Pub. No.: WO2014/019567
PCT Pub. Date: Feb. 6, 2014

(65) Prior Publication Data
US 2015/0233648 A1    Aug. 20, 2015

(30) Foreign Application Priority Data
Aug. 1, 2012 (DE) .......... 10 2012 213 542

(51) Int. Cl.
*F28D 20/00* (2006.01)
*F25D 3/00* (2006.01)

(52) U.S. Cl.
CPC ......... *F28D 20/0043* (2013.01); *F25D 3/005* (2013.01)

(58) Field of Classification Search
CPC ......... F28D 2020/0013; F28D 20/0039; F28D 20/0043; F28D 2020/0026;
(Continued)

(56) References Cited

U.S. PATENT DOCUMENTS 2,450,844 A * 10/1948 Stuart .............. F25D 11/022
137/614.04
2,592,233 A * 4/1952 Atchison .............. F25D 21/06
312/296
(Continued)

FOREIGN PATENT DOCUMENTS

CN    1158158 A    8/1997
CN    1247944 C    3/2006
(Continued)

OTHER PUBLICATIONS

English Language Translation of the PCT International Preliminary Report on Patentability, PCT/DE2013/000418, dated Feb. 12, 2015, 9 pages.
(Continued)

*Primary Examiner* — Christopher R Zerphey
*Assistant Examiner* — Harry E Arant
(74) *Attorney, Agent, or Firm* — Quarles & Brady LLP (57) ABSTRACT

A cooling system arrangement for allowing cooled storage and cooled transport of foodstuffs. Further, the cold storage device assembly may have a storage volume that includes at least one reservoir chamber formed by a liquid-tight reservoir wall and is at least partially filled with a cold storage medium. Additionally, heat insulation covers the reservoir chamber on the side facing away from the storage volume. The reservoir wall is an integral part of the cold storage device, and a coolant inlet and outlet are arranged thereon. In addition, a heat exchanger through which at least one coolant duct passes is arranged in or on the reservoir chamber so that coolants coming from the coolant inlet flow through the heat exchanger to the coolant outlet and can withdraw heat from the cold storage medium and/or can cause the cold storage medium to freeze in the process.

14 Claims, 6 Drawing Sheets

(58) Field of Classification Search
CPC ............. F28D 2020/0082; F28D 20/02; F28D 20/021; F28D 20/0034; B60H 1/32; F25D 17/02
See application file for complete search history.

(56) References Cited

U.S. PATENT DOCUMENTS

| | | | | |
|---|---|---|---|---|
| 3,019,070 | A * | 1/1962 | Dieboid | A47B 88/457 312/319.7 |
| 3,280,586 | A * | 10/1966 | Toyomatsu | F25D 16/00 165/47 |
| 4,078,150 | A * | 3/1978 | Daugherty | H02G 15/22 165/155 |
| 4,103,510 | A * | 8/1978 | Hall | B60H 1/005 62/243 |
| 4,765,151 | A * | 8/1988 | Bessey | B60N 3/104 62/239 |
| 5,172,567 | A * | 12/1992 | Sadhir | B29C 70/882 165/10 |
| 5,310,073 | A * | 5/1994 | Johannsson | A22B 7/008 220/254.3 |
| 6,092,381 | A * | 7/2000 | Hsiao | B60H 1/00264 62/237 |
| 6,658,876 | B1 * | 12/2003 | Richardson | F25D 17/02 62/201 |
| 2004/0079105 | A1 * | 4/2004 | Wood | B65D 88/126 62/371 |
| 2007/0107457 | A1 * | 5/2007 | Morris | F25D 25/025 62/382 |

FOREIGN PATENT DOCUMENTS

| | | | |
|---|---|---|---|
| JP | 11348647 A | * | 12/1999 |
| JP | 2002225536 A | | 8/2002 |
| JP | 2010042781 A | | 2/2010 |
| JP | 2010043835 A | | 2/2010 |
| JP | 2010 230275 | | 10/2010 |

OTHER PUBLICATIONS

The Patent Office of the People's Republic of China, First Office Action and Search Report, Application No. 201380051134.X, dated Dec. 23, 2015.

The International Search Report dated Nov. 25, 2013 for International Application No. PCT/DE2013/000418.

* cited by examiner

COLD RESERVOIR DEVICE AND COOLING SYSTEM ARRANGEMENT

CROSS-REFERENCE TO RELATED APPLICATIONS

This application represents the national stage entry of PCT International Application No. PCT/DE2013/000418 filed Jul. 31, 2013. The contents of this application are hereby incorporated by reference as if set forth in their entirety herein.

The invention relates to a cold storage device for cooled storage and cooled transport in particular of foodstuffs according to the preamble of claim 1 and to a cooling system arrangement using a cold storage device of this kind.

From the state of the art, different embodiments of cooling containers and of associated closing lids are known that allow cooled storage and cooled transport in particular of foodstuffs. For this purpose, the cooling containers and the closing lids have heat insulation in order to keep the storage temperature constant, i.e. at low temperatures, as long as possible independently of the temperature difference between the storage volume present in the cooling container and the ambience. To this end, it is further known to introduce cold storage media into corresponding transportable cooling containers.

Known cold storage media are usually water or another medium that is liquid at room temperature but can be frozen if needed. Owing to the phase transition between the frozen state and the liquid state, a high cold storage effect can be achieved. Because of its liquid state, the cold storage medium is usually kept in completely closed cooling elements, such as bags or plate-shaped containers, which are also known as eutectic plates. In the state of the art, these cooling elements are loosely placed into the closing lids or into the cooling container and at best they are secured against slipping by corresponding receptacles.

Although the known embodiments comprising the cooling elements allow advantageous storage and cooled transport of foodstuffs, handling of the cooling boxes and closing lids comprising the separately inserted cooling elements requires enormous effort and causes significant technical expenditures in particular if automation is sought.

Furthermore, there is a need for optimization with regard to the cold storage capacity at the available structural space.

Hygiene is of high relevance in storage and transport, the hitherto common handling of the cooling elements posing an immanent risk of contamination.

Thus, it is the object of the present invention to provide a cold storage device that, in the form of a closing lid, or in the form of a cooling box enables cooled storage and cooled transport while reducing or avoiding the afore-described disadvantages.

The established object is attained by a cold storage device according to the invention pursuant to claim 1.

A cooling system arrangement using a cold storage device is laid out in claim 8.

Advantageous embodiments are the subject-matter of the dependent claims.

For a start, the generic cold storage device is embodied in the form of a closing lid for closing an opening of a transportable cooling container having a storage volume. Alternatively, the generic cold storage device itself can be embodied in the form of a transportable cooling container having a storage volume, the first embodiment being the preferred one. At least, the cold storage device partially surrounds the storage volume, in which storage goods can be stored in a cooled fashion. The cold storage device is in particular intended to allow cooled storage and cooled transport of foodstuffs.

Cooled storage and cooled transport obviously leads to a need for storage of cold, which is generically fulfilled by the use of a cold storage medium. To this end, the cold storage device has a reservoir chamber that is formed by a liquid-tight reservoir wall. Said reservoir chamber is at least partially filled with a cold storage medium that is liquid at room temperature. Whether the reservoir chamber is completely filled with the cold storage medium or whether a free residual volume is only filled with air or another gas will be determined in particular according to the production and filling facilities and also by the properties of the cold storage medium and by its thermal expansion in particular during phase transition between liquid and solid. In correspondence to the design of the cold storage device, the reservoir chamber holding the cold storage medium is consequently arranged in the closing lid or in the cooling container.

Furthermore, the generic cold storage device has heat insulation that covers the reservoir chamber on the side facing away from the reservoir chamber. Both designs of the cold storage device in the form of a closing lid and in the form of a cooling container usually have heat insulation that completely surrounds the storage volume when jointly looking at the mating closing lid and cooling container. Alternatively, however, it is also possible to use a cold storage device in the form of a cooling container having surrounding heat insulation and to omit the closing lid in this case, considering the aspect that the cold air present in the storage volume accumulates at the bottom, and absent any other air circulation or heat radiation, a loss of cold is limited. It is also conceivable to use a cold storage device in the form of a closing lid that has covering heat insulation, while heat insulation in the associated cooling container is omitted. This may be admissible in case of small temperature differences to the ambience or in case of short storage times. Thus, regular standard boxes can be advantageously used.

For the generic cold storage device, at least the presence of a cold storage medium is relevant that is liquid at room temperature and is enclosed in a closed reservoir chamber.

While, in the state of the art, the reservoir wall realizing the reservoir chamber is part of a separate cooling element, according to the invention, the reservoir wall is now designed as an integral part of the cold storage device. This means that the reservoir chamber is firmly integrated in the cold storage device and cannot be removed. In this context, it is immaterial, however, whether assembly and disassembly of the reservoir wall is possible. In contrast to the state of the art, it is hereby no longer possible to remove the reservoir chamber from the cold storage device in the manner of a cooling element for cooling or freezing the cold storage medium, which appears to be disadvantageous at first glance.

Instead, it now is necessary to subject the cold storage device comprising the enclosed cold storage medium to a cooling. For this purpose, according to the invention, the cold storage device further has a coolant inlet and a coolant outlet. They are connected to a heat exchanger that is arranged in the reservoir chamber and through which at least one coolant duct passes. Thus, a coolant coming from the coolant inlet can flow through the heat exchanger to the coolant outlet. By using a correspondingly cooled coolant, said coolant flowing through the heat exchanger can withdraw heat from the cold storage medium and/or cause the cold storage medium to freeze.

With the embodiment according to the invention, considering the structural space, the cooling capacity of the cold storage device is significantly improved over the embodiments from the state of the art. By integrally arranging the reservoir wall as an integral part of the cold storage device, the available structural space can be used more advantageously and no additional structural space is required for introducing and removing a cooling element. Also, there is no additional opening for removal of an otherwise necessary cooling element and there are no holders for fixing a cooling element.

Furthermore, the embodiment according to the invention improves integration in an automatic system, allowing an automated cooling of the cold storage medium to be realized, whereas in the state of the art a handling system has to effect removal of the cooling elements and has to cool them again.

Since removal and introduction of a cooling element into the cold storage device is no longer necessary, improved hygiene is achieved. While the separate cooling elements may be easily contaminated during handling in the state of the art, this problem cannot arise in the first place according to the invention because the cooling elements are firmly integrated into the cold storage device.

It is particularly advantageous if the cold storage medium is water and/or an aqueous fluid and/or a eutectic. The cold storage medium can be advantageously adapted to the intended use as a function of the required cooling temperature or storage temperature of the foodstuffs or other goods to be stored. High cold storage capacity can be achieved in particular in the transition between the liquid phase and the solid phase.

The cold storage medium is advantageously selected according to its solidification point and to its intended use, i.e. the desired storage temperature. Obviously, a cold storage medium consisting of water thus allows advantageous storage at temperatures close to 0° C. (always depending on the heat insulation of the closing lid and of the cooling box and on the prevailing temperatures) and is thus particularly suited for storage of easily perishable non-frozen foodstuffs. An aqueous fluid can be a salt brine, for example, which has a low solidification point and thus can ensure storage temperatures of below 0° C. With a eutectic, it is also possible to set different solidification points both in the range above 0° C. and in the range below 0° C. in order to achieve corresponding storage temperatures.

To enable a coolant flow from the coolant inlet to the coolant outlet, said coolant inlet and said coolant outlet are advantageously designed in the form of quick release couplings. This means that to connect the coolant inlet and the coolant outlet to a corresponding counterpart, i.e. to an inlet connection and to an outlet connection, they simply need to be plugged together or pulled apart to produce a conducting connection or to disconnect the connection. In this regard, two different aspects are to be considered depending on the application and on the ambient conditions, which relate to leak tightness at the coolant inlet and at the coolant outlet.

On the one hand, loss of coolant is to be prevented when coolant flows through a connection, i.e. when the coolant inlet and the coolant outlet are connected to corresponding counterparts. This can be realized in that a sufficient sealing effect is achieved simply by plugging. To this end, an advantageous sealing element is fitted to the counterpart, for example, so that the coolant inlet and the coolant outlet can be designed without any special measures.

On the other hand, for the remaining time, in which there is no connection to the counterpart, i.e. for the duration of storage and transport, it must be advantageously ensured that no dust enters the coolant duct in the heat exchanger and that coolant remaining in the cold storage device does not leak. To this end, an adjustable lock or a removable cap can be advantageously provided. The use of a closing element closing the coolant inlet and the coolant outlet is particularly advantageous, said closing element being held in a closed position by a spring force and being automatically pushed away by the counterpart or by the pressure in the coolant so that a coolant flow is enabled.

Independently hereof, valves that can interrupt the conducting connection may be provided both at the coolant inlet and at the coolant outlet. In a particularly advantageous fashion, they can be designed to the effect that said valves open on their own upon contact with an inlet connection or an outlet connection. It may also be provided that dust caps or the like are provided on the coolant inlet or the coolant outlet, said dust caps being opened manually or opening automatically to form the connection between an inlet connection and a coolant inlet and between an outlet connection and a coolant outlet.

To this end, it is particularly advantageous if the coolant inlet and the coolant outlet are arranged at a narrow front side of a flat rectangular closing lid. On the one hand, this provides advantageous accessibility in case of the separate cold storage device in the form of a closing lid and accessibility is also ensured in case of the closing lid being placed on a cooling box. On the other hand, this arrangement of the coolant inlet and of the coolant outlet allows advantageous use of the available structural space of the flat closing lid as well as advantageous integration in an automated system.

The manner in which the heat exchanger is realized is initially immaterial as long as suitable coolant flow through the heat exchanger with cooling of the cold storage medium is enabled. However, it is particularly advantageous if the heat exchanger comprises at least one heat exchanger slat having a plate-shaped design. The plate-shaped design is advantageous in view of preventing deformation of the heat exchanger and of the heat exchanger slat, in particular taking into account the phase transition between liquid and solid and possible expansions of the cold storage medium. For this purpose, in a furthermore particularly advantageous manner, the heat exchanger has multiple plate-shaped heat exchanger slats of this kind which are arranged substantially parallel to one another.

In case of a design in the form of a flat rectangular closing lid, the heat exchanger slats are further advantageously arranged vertically to the extension of said closing lid. Thus, on the one hand, an advantageous transmission surface for cooling of the cold storage medium is achieved and, on the other hand, damage to the heat exchanger can be prevented in case of expansion of the cold storage medium during freezing.

Furthermore, it is particularly advantageous if the cold storage device has at least one temperature sensor that can monitor the state of the cold storage medium. In this regard, monitoring can be limited in the simplest case to a change of the state of matter of the cold storage medium from liquid to solid. In this respect, it can only be determined whether the cold storage medium is in the liquid or solid state, wherein the measured state, in contrast to the actual state of the cold storage medium, can depend on the design and arrangement of the temperature sensor. For example, the sensor could be a pressure sensor that detects potential expansion of the cold storage medium during freezing. However, the use of a regular temperature sensor that can determine the temperature in ° C. is advantageous.

Furthermore, in a particularly advantageous fashion, the cold storage device has a temperature sensor for monitoring the air temperature on the side of the cold storage device facing toward the storage volume. It is also possible to detect the wall temperature of the cold storage device on the side facing toward the storage volume. By measuring said wall temperature and air temperature, the temperature in the storage volume can be deduced, and thus it can be determined whether the desired storage temperature or an unsuitable temperature is present.

It is particularly advantageous if the measured value of the temperature sensor or, in the case of multiple temperature sensors, the measured values of the temperature sensors can be transmitted in a wireless manner to an external receiver. Thus, it is not necessary to read off the measured temperature values locally at the cold storage device or to produce a cable connection. Instead, the temperatures of the cold storage device can be monitored from an external location. In this manner, monitoring the state of the cold storage device becomes possible especially in an automated system, for example, wherein the present storage temperatures are detected.

To improve the cooling behavior of the cold storage device, the cold storage device in the form of a cooling container or a cooling container belonging to the closing lid has an uneven design at least in sections on the side facing toward the storage volume. The uneven design is provided with elevations and depressions that extend in a vertical direction in particular at the side walls. By way of said elevations and depressions, i.e. the uneven design, cold air circulation in the storage volume is promoted, and thus a more uniform storage temperature is achieved than would be the case in the case of planar inner walls.

In case of a cold storage device in the form of a closing lid, the latter has a curvature on the side facing toward the storage volume, said curvature being concave, i.e. centrally pointing away from the storage volume. By way of the curved shaping, cold air circulation is improved to the effect that the air cooling at the cold storage device is guided outward and downward at the curvature in the storage volume and thus toward the side walls of the cooling container.

To allow for automated warehousing, it is particularly advantageous if the cold storage device in the form of a closing lid, taking into account the associated cooling containers, or the cold storage device in the form of a cooling container, taking into account an associated closing lid, is realized as being compatible with a so-called Euro box. Compatibility must take into account both storage and transport so that known system technologies for storage and transport of Euro boxes can be employed without requiring any special adaptation.

In this regard, it is particularly advantageous if, taking into account the cooling container as well as the associated closing lid, the cold storage device has basic dimensions of 40×30 cm with a height between 20 cm and 35 cm in a first embodiment or basic dimensions of 60×40 cm with a height between 20 cm and 45 cm in a second embodiment or basic dimensions of 80×60 cm with a height between 30 cm and 45 cm in a third embodiment. Thus, it is possible to use existing storage systems for storing Euro boxes and for their transport and to allow cooled storage and cooled transport without requiring special measures with respect to storage and transport.

Furthermore, the invention relates to a cooling system arrangement using at least one afore-described cold storage device. For this purpose, the cooling system arrangement has a coolant source, the type of said coolant source being initially immaterial. In the simplest case in this respect, the coolant source may be a connection to an external cooling machine, which centrally provides coolant for different systems, for example. Likewise, however, a cooling machine for producing the coolant may be part of the cooling system arrangement and may form the coolant source. In this context, the coolant is provided as a cooled liquid coolant by the coolant source so as to be able to realize a corresponding coolant flow and to realize cooling of the cold storage medium.

The coolant flow in the heat exchanger of the cold storage device is made possible by means of a coolant charging station. Said coolant charging station has an inlet connection complementary to the coolant inlet and an outlet connection complementary to the coolant outlet. The cold storage device can be accommodated in the coolant charging station in such a manner that a conducting connection can be formed between the inlet connection and the coolant inlet and between the outlet connection and the coolant outlet, thus allowing coolant to flow through the cold storage device, i.e. through its heat exchanger.

The cooling system arrangement according to the invention comprising a cold storage device that can be cooled in a coolant charging station allows automated cooled storage and cooled transport in particular of foodstuffs. By means of advantageous system technology, cooling of the cold storage device can take place completely automatically so that no manual operation is required. Thus, optimal integration into a logistical system is made possible and in particular cooled storage is made possible without the need for manual handling of cooling elements or the like.

In this regard, it is particularly advantageous if the coolant is a brine, in particular a salt brine. By using a brine, variable cooling temperatures can be realized, which in this case may also lie well below the freezing point of water. Thus, the coolant flow can be realized even at low temperatures. Because of this, the selection of the advantageous cold storage medium can be made primarily depending on the storage goods. The use of a salt brine is further advantageous because leakage is harmless in connection with the storage of foodstuffs (although there may be a higher risk of corrosion).

In particular in case of the intended flow of coolant through the cold storage device and the consequently required repeated production of a connection and separation of the connection between the inlet connection and the coolant inlet and between the outlet connection and the coolant outlet, small leakage amounts cannot be excluded, but are harmless to the largest possible extent when using a salt brine.

Furthermore, it is particularly advantageous if the cold storage device can be introduced into the coolant charging station in the manner of a drawer and can be deposited therein so that the coolant can flow through the cold storage device. This is particularly advantageous in particular if the cold storage device is designed in the form of a flat rectangular closing lid so that the coolant charging station can be advantageously designed in the shape of a box surrounding the cold storage device with little required space.

It may be provided that the cold storage device is first deposited on an extendable deposition device and the deposition device is then driven into the coolant charging station in the manner of a drawer. It may also be provided that deposition rails or the like are present in the coolant charging station, on which the cold storage device can be simultaneously deposited while being driven in. Further, it is conceivable, for example, that the cold storage device is first driven completely into the coolant charging station by means of a handling device in order to be subsequently deposited therein.

In this regard, it is particularly advantageous if simultaneously to the driving-in, a coolant-conducting connection is formed between the inlet connection and the coolant inlet and between the outlet connection and the coolant outlet. This means that by driving or pushing the cold storage device into the coolant charging station in the manner of a drawer, the conducting connection is immediately formed at least upon completion of the movement. Thus, no additional measures are required for forming the conducting coolant connection. In particular in association with the design of the coolant inlet and coolant outlet in the form of a quick-release coupling, the connection can be formed immediately upon pushing-in.

If the final deposition in the coolant charging station takes place only after the cold storage device has been driven into the coolant charging station, it must merely be observed that the inlet connection and the outlet connection have the necessary flexibility or mobility to allow for a corresponding depositing motion of the cold storage device in the coolant charging station when the conducting connection has already been formed.

In an advantageous embodiment, the coolant charging station has an extendable and retractable deposition device for accommodating the cold storage device. This means that the cold storage device can be deposited on the extended deposition device, wherein both the deposition device and the cold storage device deposited thereon can then be retracted into the coolant charging station.

The manner in which the deposition device is retracted and extended is initially immaterial. In this respect, the motion may take place manually or by means of some kind of handling device, for example. However, it is particularly advantageous to use a drawer drive that is associated with the coolant charging station. In a particularly advantageous fashion, said drawer drive may be a hydraulic or pneumatic cylinder. By using a corresponding drawer drive, it is similarly made possible in a particularly advantageous fashion to ensure leak tightness and complete closure between the inlet connection and the coolant inlet and between the outlet connection and the coolant outlet. Also, the embodiment comprising a deposition device and a drawer drive facilitates accommodation of the cold storage device in the coolant charging station.

Furthermore, it is particularly advantageous if the coolant charging station comprises at least one locking means that secures the cold storage device in the coolant charging station. This secure lock has the task of preventing loss of coolant between the inlet connection and the coolant inlet and between the outlet connection and the coolant outlet. Because of a flow of liquid coolant from the inlet connection into the coolant inlet and from the coolant outlet into the outlet connection at corresponding pressure and flow speed, leakage is to be prevented as far as possible. To this end, the locking means secures the corresponding connections against release. The type of the locking means is initially immaterial in this context.

In a first embodiment version, the locking means is realized by an advantageous drawer drive. This means that the drawer drive itself already prevents the cold storage device in the coolant charging station from moving out of the end position. Likewise, the locking means can be formed in that an adjustable bolt or another kind of adjustable locking means prevents removal of the cold storage device after the cold storage device has been driven completely into the coolant charging station. The locking means can engage both at the end of the cold storage device facing toward the coolant inlet and at the end facing toward the coolant outlet and it can also be arranged at the same side in that a corresponding complementary locking facility is offered on a circumferential edge of the cold storage device, for example. In case the cold storage device is first driven into the coolant charging station and subsequently deposited in the coolant charging station, it is also possible to provide a fixed element as a locking means over which the cold storage device is lifted when being driven in and against which it abuts when being deposited.

Furthermore, it is advantageous for dust-protected storage of the cold storage device in the coolant charging station, in particular for heat-insulated storage, if the coolant charging station comprises at least one forward loading hatch. Said loading hatch is opened for loading with the cold storage device and closed again after receiving the cold storage device. The loading hatch can be connected to a drawer-type deposition device and it can also be a separate component that is moved for loading and unloading of the cold storage device.

Furthermore, the advantageous cooling system arrangement comprises a valve arrangement. Said valve arrangement enables the corresponding coolant flow for cooling the cold storage medium in the cold storage device. For this purpose, the valve arrangement is connected to a coolant source as well as to the inlet connection and the outlet connection of the coolant charging station. Furthermore, there is a connection from the valve arrangement to a pressurized air supply. The especially advantageous switching of the valve arrangement allows a coolant-conducting connection from the coolant source to the inlet connection and thus, consequently, a coolant flow through the coolant duct of the heat exchanger of the cold storage device for cooling the corresponding cold storage medium.

When the cooling of the cold storage medium is completed, the valve arrangement interrupts the coolant-conducting connection from the coolant source to the inlet connection in a special manner, whereupon a conducting connection can be formed from the pressurized air supply to the inlet connection. By means of this advantageous embodiment of the valve arrangement and its manner of switching, pressurized air can be guided through the heat exchanger following the coolant. Thus, the coolant can be expelled by the flowing pressurized air.

By means of this special embodiment of the valve arrangement and its switching options, it is made possible to use the cold storage devices for storage and transport for the regular duration of use while it is substantially free of coolant. Further loss of coolant is thus prevented to the largest possible extent without requiring additional valve technology or caps in the cold storage device.

The special embodiment of the cooling system arrangement further comprises a handling device by means of which a cold storage device can be transferred to the coolant charging station. Said handling device can take over the cold storage device either from a similarly automated transport system or from a designated transfer station. At least, the handling device is designed to the effect that driving-in and deposition in the coolant charging station are ensured. Depending on the degree of automation of the coolant charging station, the handling device is thus to be designed to the effect that it also drives the cold storage device into the coolant charging station and deposits it therein or that it can optionally deposit it on an extended deposition device, wherein the integrated drawer drive of the coolant charging station then automatically pulls in the deposition device including the cold storage device. The design of the coolant charging station and of the handling device in terms of distribution of automation is determined in particular by the throughput and by the size of the system.

The special cooling system arrangement has a plurality of coolant charging stations that are arranged side by side and one on top of the other. Thus, a larger effort can be put in with regard to the design of the coolant charging station in a smaller system, for example, and the coolant charging stations are thus preferably equipped with a drawer drive, whereas in case of a large number of coolant charging stations they are merely designed in the form of a rack, wherein the handling device can realize both a driving-in and a deposition into the coolant charging station.

In a special manner, the cooling system arrangement further comprises a temperature monitoring system that receives and evaluates the measured temperature data from currently used cold storage devices. This temperature monitoring system makes it possible that, when a general limit temperature and/or a limit temperature set individually for the storage purpose is exceeded, the heated cold storage device is replaced with a cooled cold storage device. Thus, it can be ensured that in any case a sufficient cooling is present for the storage purpose and that there is no risk of an unsuitably high temperature in a storage volume.

To this end, the particularly advantageous cooling system arrangement has an automatically controlled transport system that can realize the replacement of cold storage devices. The replacement can take place in two different ways, which are not mutually exclusive but can also be used in parallel or as alternatives.

For this purpose, in a first embodiment version, a cooling box having a heated cold storage device in the form of a closing lid is taken from the storage location to the coolant charging stations. The heated cold storage device is removed and is replaced with a cooled cold storage device by the handling system present at the coolant charging station. Subsequently, the cooling box including the cooled cold storage device is transported back to the storage location or to a new storage location. This means that in this case the cold storage device is replaced at the cooling location of the cold storage devices by transporting the entire cooling box including its content back and forth.

In a second version, however, a cooled cold storage device is transported from the coolant charging stations to the storage location of the heated cold storage device, wherein a replacement can then take place at or near the storage location. Once the heated cold storage device has been replaced with the delivered cooled cold storage device, the heated cold storage device can then be transported back to the coolant charging stations in order to cool it again. To this end, in a particularly advantageous manner, the cooling box is removed from its storage space in a storage rack or the like and the cold storage devices are exchanged without further transport, wherein the cooling box including its content and the new cooled cold storage device can be placed back onto its storage space.

To prevent loss of cold on the transport route from the coolant charging stations to the respective storage location, the transport system has advantageous heat-insulated cover receptacles for accommodating corresponding cold storage devices.

It is particularly advantageous in this embodiment of a cold storage device and of a cooling system arrangement according to the invention that a both modular and flexibly expandable design is available. This means that the number of cold storage devices as well as the number of cooling boxes and the number of required coolant charging stations can be increased according to the type of application. Thus, an individual adaptation to the respectively required cooling capacities and to the required cooling volume can be created. At the same time, it is possible to use the cold storage device for transport of foodstuffs to the end consumer, for example, a renewed cooling of the cold storage device being possible there by means of another coolant charging station. Thus, if a cooling system arrangement is present both at the supplier and at the recipient, a closed cold chain can be achieved using corresponding cold storage devices, wherein the necessary system technology can be limited to the respectively required minimum.

In a particularly advantageous embodiment, a cold storage device of the afore-described kind is employed for different intended uses. They include, on the one hand, the use as a closing lid of a cooling box. However, the same cold storage device can also be used in a cooling device in the form of a refrigerator, i.e. a cooling box with a closing door at the front. In this case, the cold storage device is placed from the top onto the refrigerator that is open at the top in the same manner as in case of the cooling box. Thus, there is no need for any cooling technology in the refrigerator in order to cool the content of the refrigerator, i.e. the power connection can (but does not have to) be omitted without substitution. Instead, cooling is made possible by the cold storage device.

In an advantageous embodiment, the cold storage device is designed as a closing lid for a refrigerator in the afore-described fashion and is cooled in the afore-described manner in a coolant charging station. However, it is particularly advantageous if in addition to the coolant charging station an additional cooling is provided, by means of which a cold storage device placed on a cooling box or on a refrigerator can be cooled. For this purpose, all that is required is the installation comparable to the cooling system arrangement, wherein, however, two flexible thermally insulated hose connections to an inlet connection and to an outlet connection are used instead of the coolant charging station.

The embodiment of the refrigerator having wheels at the bottom is particularly advantageous. Thus, it becomes possible to use the refrigerator comprising a cold storage device as needed at different locations and to allow rolling transport directly in the refrigerator in the manner of a cooled service trolley.

Furthermore, the addition of a mobile additional cooling is advantageous. It allows cooling of the cold storage device adapted to the respective situations, such as for festive events or the like. For example, two cold storage devices can be kept ready for a cooling box or for a refrigerator, one being used for cooling foodstuffs and the other being connected to the additional cooling.

When using the cold storage device in a cooling container as well as when using it in a refrigerator, a replacement of the cold storage device with an already cooled cold storage device can thus be advantageously realized if the temperature of the cold storage device or the temperature in the storage volume rises. For this purpose, all that is required is taking the cold storage device that has been cooled in the coolant charging station or at the additional cooling to the cooling container or to the refrigerator, where the already heated cold storage device is replaced with the delivered cooled cold storage device. Subsequently, the heated cold storage device is brought back to the coolant charging station or to the additional cooling in order to be cooled again.

In the following figures, an exemplary cold storage device in the form of a closing lid, an associated cooling box and a cooling system arrangement will be illustrated in an exemplary embodiment.

Figure 1A:
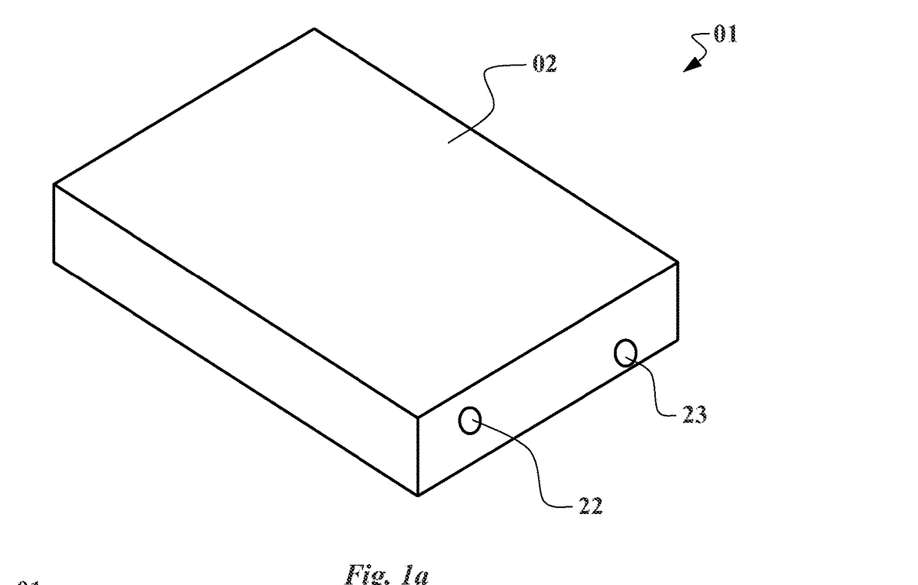
FIG. 1 shows a cold storage device in the form of a flat rectangular closing lid.
Figure 1B:
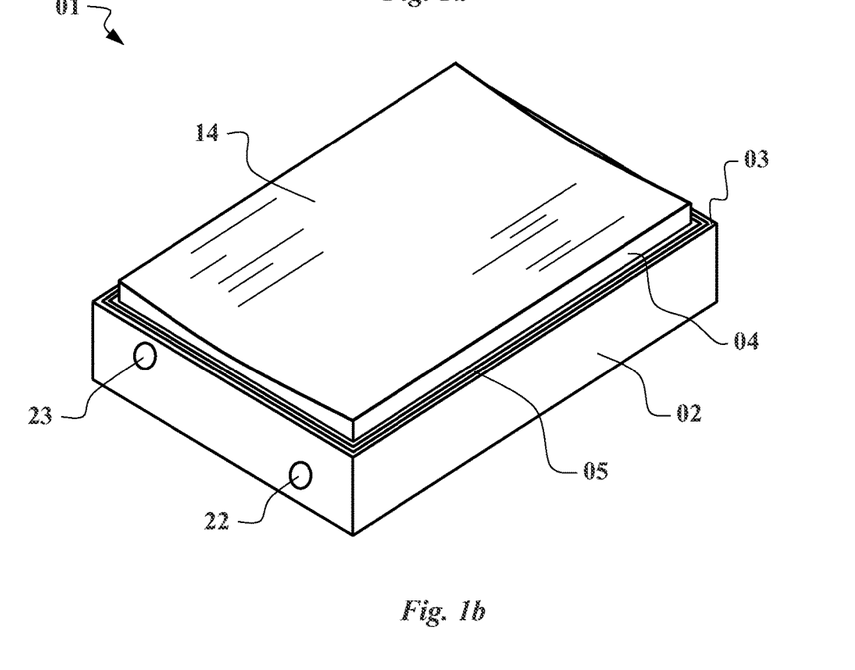

In FIG. 1a, an exemplary cold storage device in the form of a closing lid is illustrated in a top view, whereas FIG. 1b shows the same in a view from below. With regard to the associated explanation, reference is further made to FIG. 2, in which a section through the cold storage device 01 according to FIG. 1 is illustrated.

Figure 2:
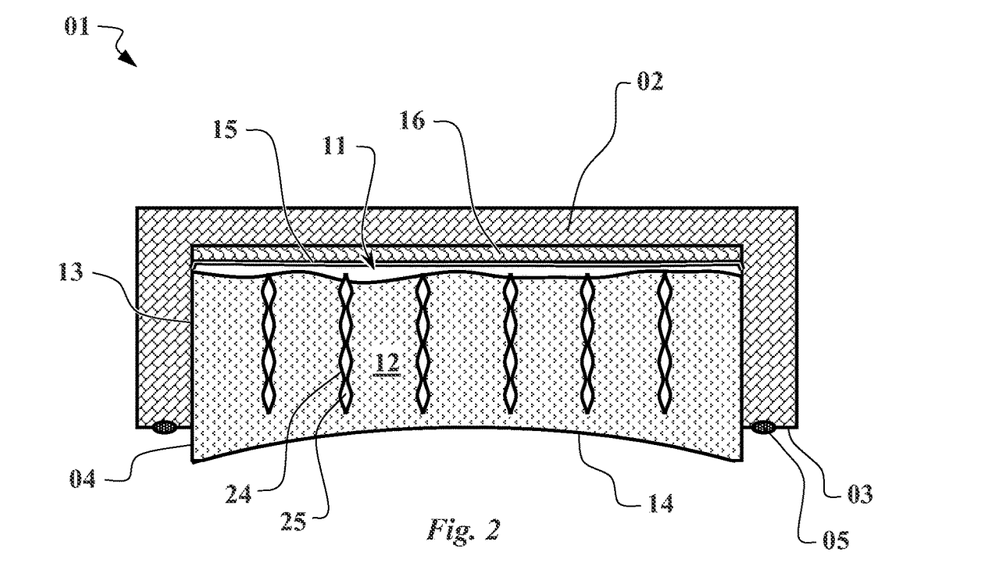
FIG. 2 shows a section through the cold storage device according to FIG. 1.

On the side facing outward, i.e. on the side facing away from the storage volume 35, the cold storage device 01 has surrounding heat insulation 02. Said heat insulation 02 serves to insulate the storage volume 35 and the cold storage means 12 against the ambience. Furthermore, the cold storage device 01 in the form of the closing lid has a circumferential placement surface 03 with an integrated seal 05, which 03 allows flat tight placement on the associated cooling container 31 so that heat loss as low as possible is achieved in the area of the placement surface 03. The illustrated embodiment of the heat insulation 02 and of the placement surface 03 and of the seal 05 are sufficiently known from the state of the art, no further explanation thus being required in this regard.

In this entirely new embodiment of a cold storage device 01, this exemplary embodiment of a cold storage device 01 has a cold storage medium 12 stored in a reservoir chamber 11, the reservoir chamber 11 being formed by a liquid-tight closed reservoir wall 13. The reservoir wall 13 in turn comprises a section 14 that faces toward the storage volume 35 and that simultaneously forms the cooling surface at the storage volume 35. The section 14 of the reservoir wall 13 thus simultaneously forms a part of the outer wall of the cold storage device 01.

On the opposite side in this embodiment, a section 15 of the reservoir wall 13 is formed by an elastic wall. The background behind selecting an elastic wall 15 is that the cold storage medium 12 (usually, depending on the medium) undergoes volume expansion during the phase transition from liquid to solid. To prevent damage to the heat exchanger 21 present in the reservoir chamber 11 and to prevent damage to the reservoir wall 13, an elastic wall 15 is used at the top side, which 15 can give way to the rising pressure during freezing.

To prevent deformation of the outer side of the cold storage device 01, an elastic mold 16 may further be introduced between the heat insulation 02 and the elastic wall 15. Said elastic mold 16 may simultaneously effect thermal insulation, wherein, however, the necessary compressibility in the function as a compensation body in case of movement of the elastic wall 15 must be present. To this end, the heat insulation 02 may be made of a closed-cell hard plastic foam, whereas the elastic mold 16 may be produced from an open-pore soft foam.

It is further visible that the cold storage medium 12 does not completely fill the reservoir chamber 11, but that a free residual volume remains instead. The latter is partly due to production because it is not always possible during filling to completely fill the reservoir chamber with cold storage medium 12 and to subsequently close it tightly. Also, a residual free volume of the reservoir chamber 11 facilitates thermal expansion of the cold storage medium 12 without damage to the cold storage device 01.

Further, it is visible that the section 14 of the reservoir wall 13 facing toward the storage volume 35 has a curved, i.e. a concave shape in this embodiment. This has the effect that air cooling at the surface, i.e. at the section 14, falls outward along the surface 14 within the storage volume 35, improved air circulation thus being achieved in the storage volume 35.

Figure 3:
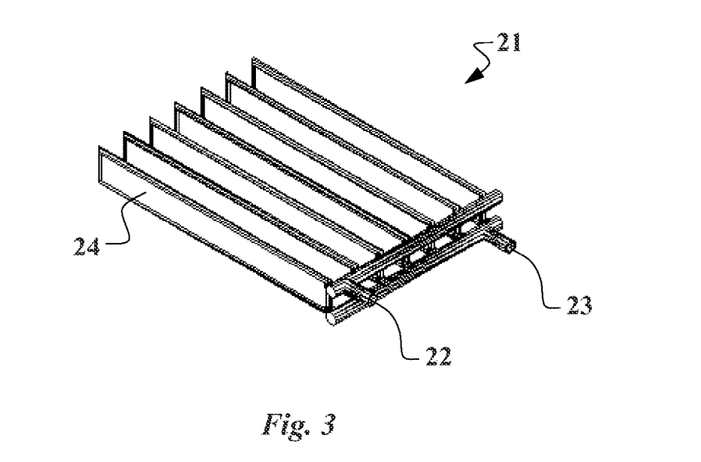
FIG. 3 shows a heat exchanger for the embodiment of FIG. 1.

Further, the heat exchanger 21 present in the reservoir chamber 11 is rudimentarily visible, which 21 is additionally illustrated in FIG. 3. Said heat exchanger 21 comprises a plurality of flat heat exchanger slats 24, which 24 are arranged in parallel, coolant ducts 25 running through each of them. Said coolant ducts 25 are each interconnected at one side and are guided to a coolant inlet 22 and to a coolant outlet 23. Thus, coolant flow through the heat exchanger 21 is made possible.

Coming back to FIGS. 1a and 1b, the arrangement of the coolant inlet 22 and of the coolant outlet 23 at a front side of the rectangular flat closing lid 01 becomes apparent. The coolant inlet 22 and the coolant outlet 23 are embedded in the heat insulation 02 and are completely surrounded by it except at the front side so that a flush connection without any projection is produced.

Figure 4:
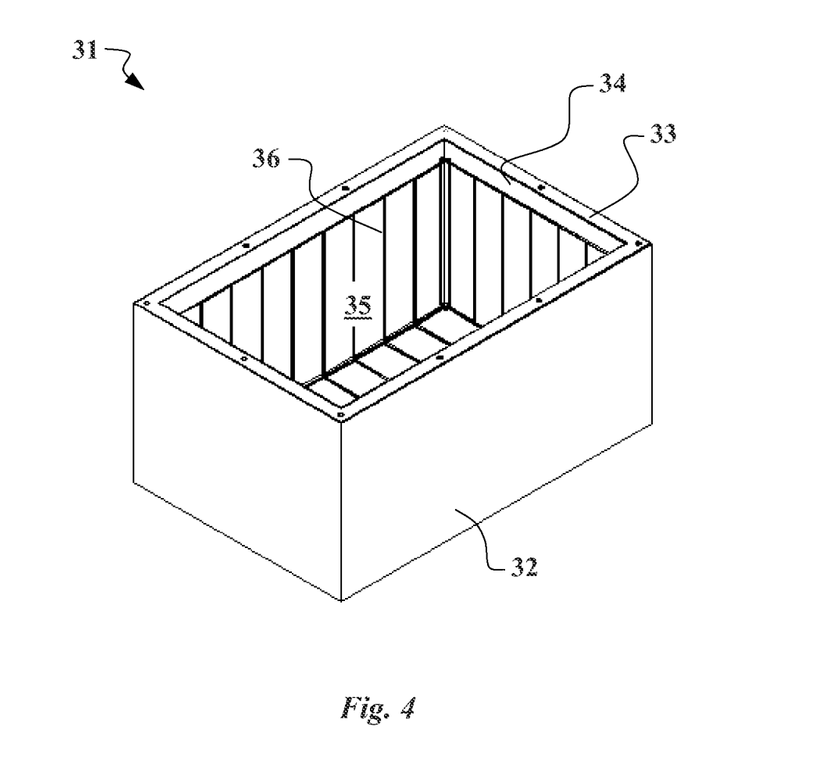
FIG. 4 shows a cooling box belonging to the cold storage device according to FIG. 1.

In FIG. 4, a cooling container 31 belonging to the cold storage device 01 is illustrated. It is visible that the cooling container 31 is designed to be open at the top, as is usual in a cooling box, and to have heat insulation 32 and that it forms the storage volume 35. The closing lid, i.e. the cold storage device 01, is placed on the cooling box 31 at the placement surface 33, wherein the contact surfaces 34, as shoulders in the wall of the cooling container 31, allow for secure positioning of the cold storage device 01 with the aid of its contact surfaces 04. The substantial aspect is that the side walls of the cooling container 31 have an uneven design 36 with elevations and depressions. Said elevations and depressions, which extend substantially vertically, promote air circulation within the storage volume 35 while the latter is correspondingly filled with storage goods.

Figure 5A:
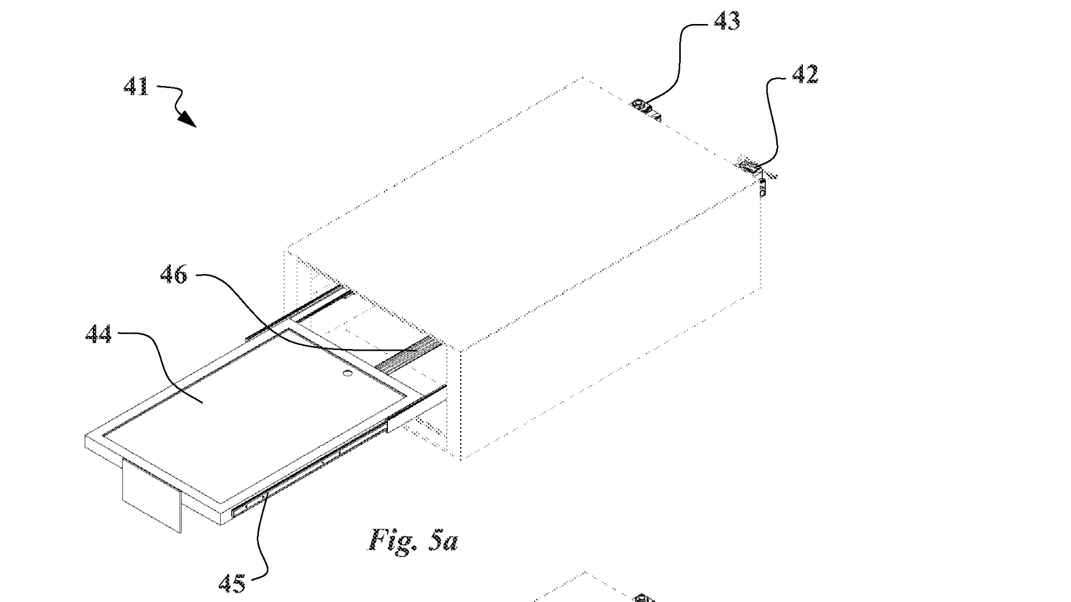
FIG. 5 shows a coolant charging station comprising an extendable deposition device.
Figure 5B:
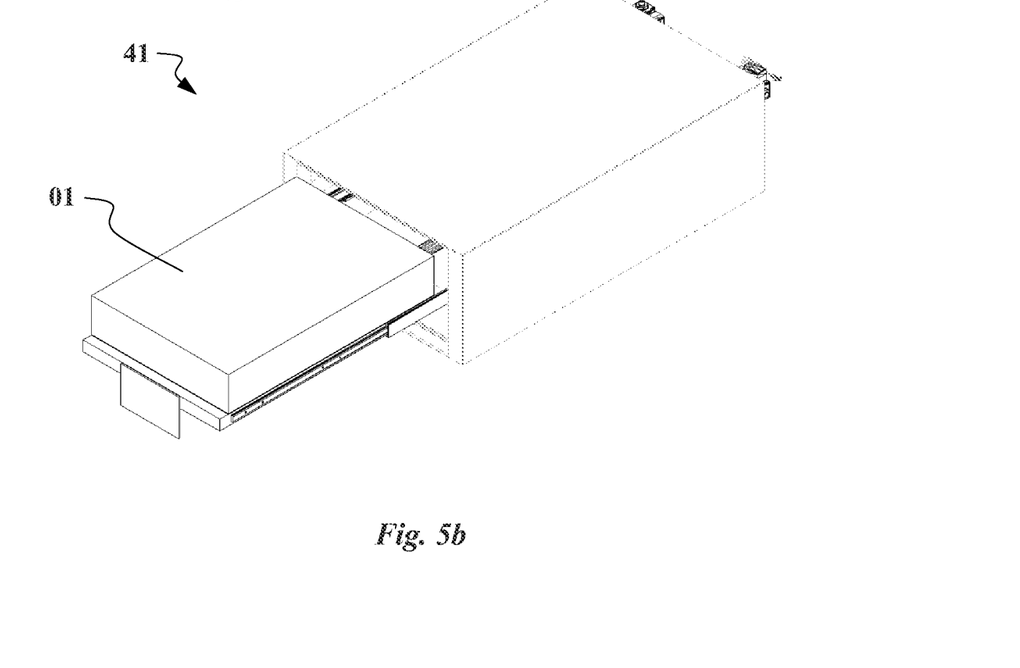

In FIG. 5a, a simplest embodiment of a cooling system arrangement is now illustrated by way of1 example. A coolant charging station 41 is visible, which 41 is designed in the shape of a box and has a deposition device 44 extendable in the manner of a drawer for accommodating the cold storage device 01. Extension and retraction is made possible by the drawer guide 45, the actual motion being realized by a drawer drive 46 in the form of a pneumatic cylinder. Arranged at the rear, there is an inlet connection 42 and an outlet connection 43 for connection to a valve arrangement 47 and to a coolant source, respectively. In addition, FIG. 5b illustrates the coolant charging station 41 including a cold storage device 01 placed on the deposition device 44. When the cold storage device 01 is driven in, the coolant inlet 22 is automatically connected to the inlet connection 42 and the coolant outlet 23 is automatically connected to the outlet connection 43 because of the drawer-like design and the presence of the drawer drive 46.

Figure 6:
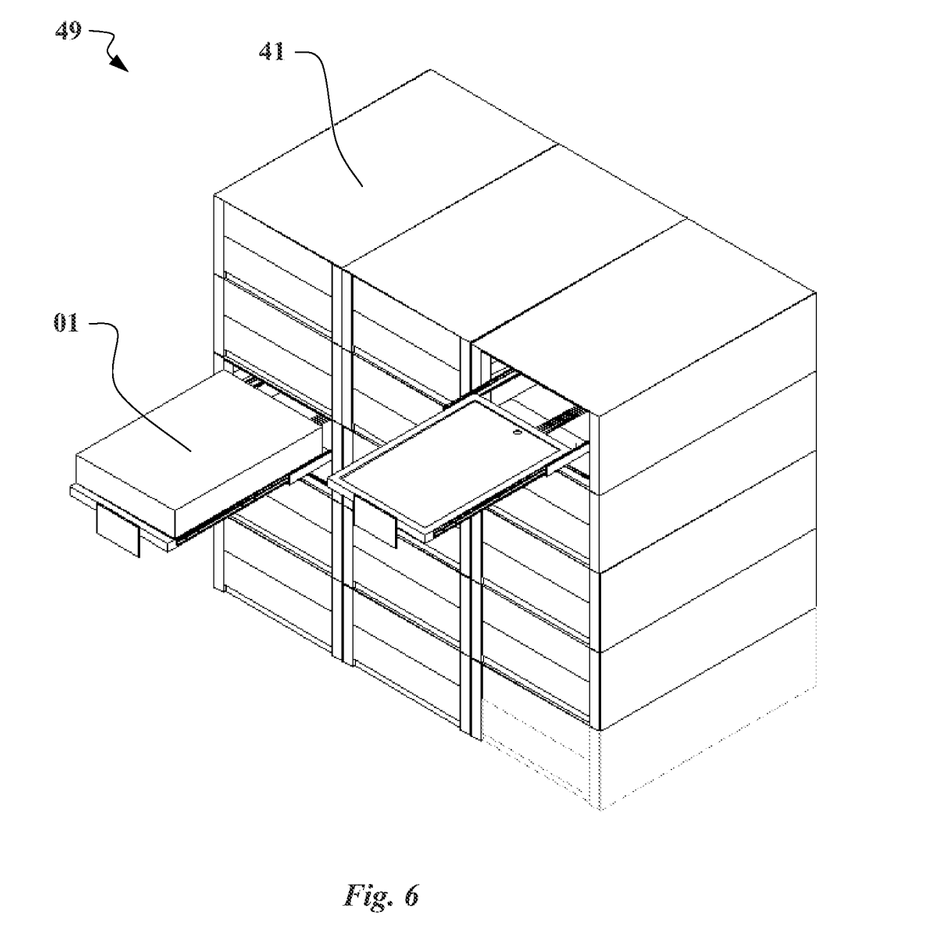
FIG. 6 shows a cooling system arrangement comprising a plurality of coolant charging stations according to FIG. 5.

FIG. 6 shows a cooling system arrangement comprising a group 49 of coolant charging stations 41. It is obvious that in order to increase the capacity in a simple manner, the individual coolant charging stations 41 can basically be extended at will in rows and columns until the desired capacity for cooling cold storage devices 01 is reached.

Figure 7:
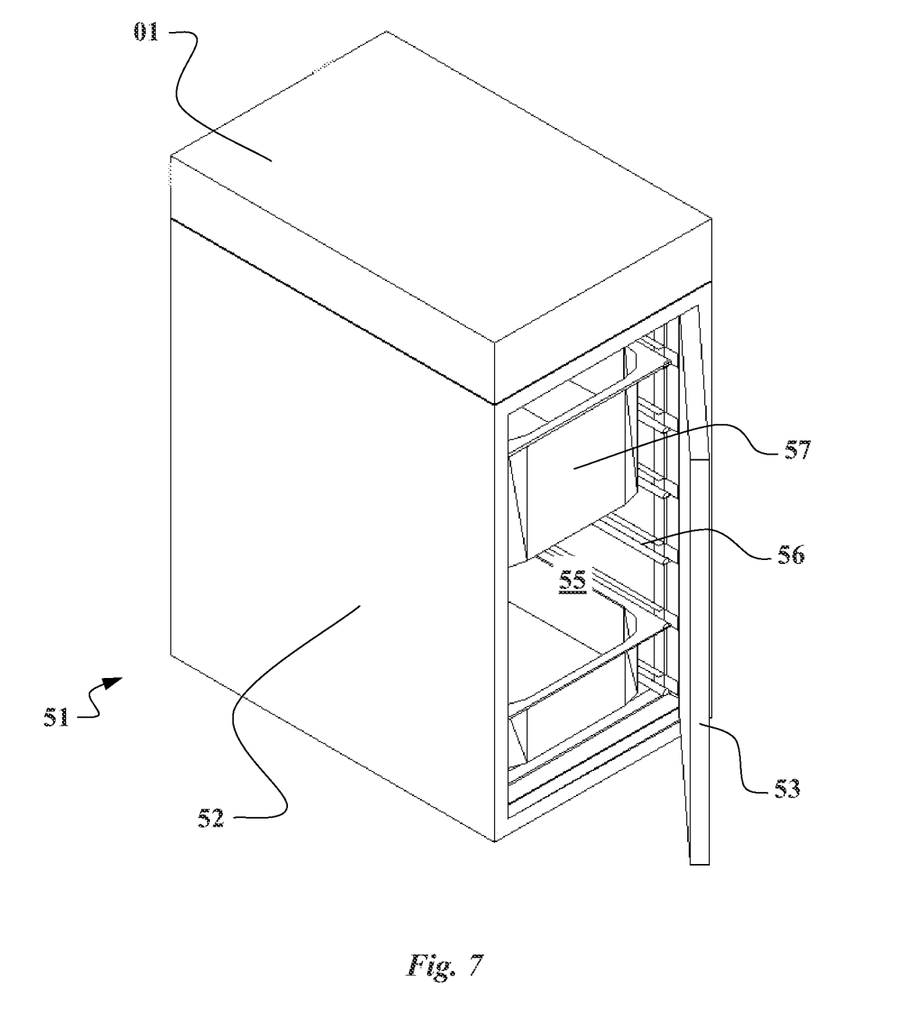
FIG. 7 shows another type of usage of a cold storage device according to FIG. 1 for a refrigerator.

FIG. 7 illustrates another optional use for a cold storage device 01 in the form of a closing lid. Instead of the previously provided cooling container 31, now a kind of refrigerator 51 is illustrated. Again, said refrigerator 51 obviously comprises heat insulation 52 at the outer side and, deviating from the design of the cooling container 31, a heat-insulated refrigerator door 53. Storage rails 56 are arranged by way of example within the illustrated refrigerator 51, into which 56 the associated storage trays 57 can be pushed. Thus, it becomes possible, for example, to allow flexible cooling of a refrigerator 01 without a power supply or the like. Furthermore, the design of FIG. 7 shows the possibility of also providing this kind of embodiment of a refrigerator 51 with wheels at the bottom and to use it as a coolable service station.

The invention claimed is:

1. A cooling system arrangement comprising:
   a coolant source providing a cooled liquid coolant;
   a transportable cooling container having a storage volume and an opening;
   a cold storage device in the form of a closing lid sized and dimensioned for receipt on the opening in the transportable cooling container for closing the opening of the transportable cooling container; and
   a coolant charging station configured to charge the cold storage device; wherein said closing lid comprises:
      at least one reservoir chamber formed by a liquid-tight reservoir wall said liquid tight reservoir wall being an integral part of the cold storage device, the reservoir chamber comprising a first uninsulated side adapted to be received on the opening in the transportable cooling container and to form a cooling surface at the storage volume and a second side adapted to face away from the opening in the transportable cooling container;
      a cold storage medium at least partially filling said at least one reservoir chamber, said cold storage medium being liquid at a first temperature and solid at a second temperature, wherein the second temperature is less than the first temperature,
      a heat insulation covering the reservoir chamber on the second side of the reservoir chamber,
      a coolant inlet and a coolant outlet arranged on the liquid tight reservoir wall and
      a heat exchanger arranged in or on the reservoir chamber and through which at least one coolant duct passes, wherein coolants flowing through the coolant inlet and through the heat exchanger to the coolant outlet withdraws heat from the cold storage medium; and
   wherein said at least one coolant charging station comprises:
      a deposition plate coupled to a drawer drive, the deposition plate extendible and retractable in the manner of a drawer and receiving said cold storage device, and
      an inlet connection and an outlet connection, said inlet connection being in fluid communication with said coolant source and being complementary to the coolant inlet in the cold storage device, said outlet connection being complementary to the coolant outlet in the cold storage device, said coolant inlet is urged into engagement with said inlet connection and said outlet is urged into engagement with said outlet connection to automatically connect said coolant inlet with said inlet connection and said coolant outlet with said outlet connection, and coolant coming from the coolant source is adapted to flow through the cold storage device through said coolant inlet and out of said coolant outlet.

2. The cooling system arrangement according to claim 1, in which the cold storage medium is water, an aqueous fluid, or a eutectic.

3. The cooling system arrangement according to claim 1, in which the coolant inlet and the coolant outlet of the cold storage device are formed by quick release couplings arranged at a narrow front side of the cold storage device.

4. The cooling system arrangement according to claim 1, in which the heat exchanger of the cold storage device has at least one heat exchanger slat having a plate-shaped design.

5. The cooling system arrangement according to claim 1, in which the cold storage medium an air temperature or a wall temperature on a side of the cold storage device facing toward the storage volume is monitorable.

6. The cooling system arrangement according to claim 1, in which a cooling container or a cooling container forming part of the cold storage device in the form of a closing lid has, at least in sections, an uneven design with elevations and depressions on the side facing toward the storage volume, the elevations and depressions extending in a vertical direction in the side walls to promote cold air circulation in the storage volume.

7. The cooling system arrangement according to claim 1, in which the coolant is a brine.

8. The cooling system arrangement according to claim 1, in which the cold storage device is holdable in the coolant charging station in such a manner that a loss of coolant between the inlet connection and the coolant inlet and between the outlet connection and the coolant outlet is prevented.

9. The cooling system arrangement according to claim 1, in which the coolant charging station includes at least one forward loading hatch that is opened for loading with the cold storage device so that a dust-protected, heat-insulated storage of the cold storage device in the coolant charging station is ensured.

10. The cooling system arrangement according to claim 1, in which at least one of a plurality of the cold storage devices in use is replaceable with a replacement cooled cold storage device when a general limit temperature and/or a limit temperature set individually for the storage purpose is exceeded.

11. The cooling system arrangement according to claim 10, in which a transportable cooling container including the at least one of the plurality of cold storage devices is brought to the coolant charging station and the at least one of the plurality of cold storage devices is replaced with the replacement cooled cold storage device.

12. The cooling system arrangement according to claim 1, wherein multiple heat exchanger slats of the cold storage device are oriented substantially parallel to one another and substantially vertical to an extension of the cold storage device.

13. The cooling system arrangement according to claim 1, wherein a measured temperature value is transmittable in a wireless manner externally.

14. The cooling system arrangement according to claim 1 in which, following the coolant, pressurized air can flow through the heat exchanger to expel the coolant.

* * * * *

UNITED STATES PATENT AND TRADEMARK OFFICE
CERTIFICATE OF CORRECTION

PATENT NO. : 10,288,358 B2
APPLICATION NO. : 14/417375
DATED : May 14, 2019
INVENTOR(S) : Hubert Goseling Page 1 of 1

It is certified that error appears in the above-identified patent and that said Letters Patent is hereby corrected as shown below:

In the Specification

Column 12, Line 54, "way of1 example." should be --way of example--.

Signed and Sealed this
Twenty-fifth Day of June, 2019

Andrei Iancu
*Director of the United States Patent and Trademark Office*